(12) United States Patent
Petkov et al.

(10) Patent No.: US 10,962,977 B2
(45) Date of Patent: Mar. 30, 2021

(54) METHOD FOR COMMUNICATION BETWEEN AT LEAST ONE METER DEVICE AND AN AIRBORNE DEVICE

(71) Applicants: DIEHL METERING SYSTEMS GMBH, Nuremberg (DE); DIEHL METERING GMBH, Ansbach (DE)

(72) Inventors: Hristo Petkov, Nuremberg (DE); Thomas Lautenbacher, Erlangen (DE); Thomas Kauppert, Nuremberg (DE); Klaus Gottschalk, Winkelhaid (DE); Raphael Mzyk, Kammerstein (DE); Philip Roehrle, Ansbach (DE); Michael Traenkler, Nuremberg (DE)

(73) Assignees: Diehl Metering Systems GmbH, Nuremberg (DE); Diehl Metering GmbH, Ansbach (DE)

( * ) Notice: Subject to any disclaimer, the term of this patent is extended or adjusted under 35 U.S.C. 154(b) by 232 days.

(21) Appl. No.: 16/175,236

(22) Filed: Oct. 30, 2018

(65) Prior Publication Data
US 2019/0146502 A1    May 16, 2019

Related U.S. Application Data

(63) Continuation of application No. PCT/EP2017/000413, filed on Apr. 4, 2017.

(30) Foreign Application Priority Data

Apr. 30, 2016 (DE) .................... 10 2016 005 403.4

(51) Int. Cl.
*G05D 1/00* (2006.01)
*H04Q 9/00* (2006.01)
(Continued)

(52) U.S. Cl.
CPC .......... *G05D 1/0094* (2013.01); *G01D 4/006* (2013.01); *G05D 1/0011* (2013.01); *G05D 1/028* (2013.01);
(Continued)

(58) Field of Classification Search
CPC .... G05D 1/0094; G05D 1/0011; G05D 1/028; H04Q 9/00; H04Q 2209/40;
(Continued)

(56) References Cited

U.S. PATENT DOCUMENTS 8,639,396 B1 *  1/2014  Hirsch ................. G08G 5/0069
                                                                    701/3
9,157,766 B2 * 10/2015  Holmdahl .............. G01D 4/006
(Continued)

OTHER PUBLICATIONS

Neto, JRT, et al. "Towards the Use of Unmanned Aerial Vehicles for Automatic Power Meter Readings." 2015 IEEE Int. Conference on Computer and Information Technology; Ubiquitous Computing and Communications; Dependable, Autonomic and Secure Computing; Pervasive Intelligence and Computing. IEEE, 2015. (Year: 2015).*
(Continued)

*Primary Examiner* — Christopher P McAndrew
(74) *Attorney, Agent, or Firm* — Laurence A. Greenberg; Werner H. Stemer; Ralph E. Locher (57) ABSTRACT

A method provides communication between a meter and a flying device. The meter records consumption data. The flying device performs flight movements to a prescribed target position of the meter. Radio signals are received by a reception device and information is ascertained, relating to the transmission quality of a radio channel, based on the received signals. A poor transmission quality, satisfaction of which is dependent on the quality of the information, results in the reception of received signals and the ascertainment of the information being repeated after a communication protocol for communication with the meter has been changed,
(Continued)

a position of the flying device being altered and/or a directivity of the reception device is altered until the transmission quality or a termination condition is satisfied. Upon having a satisfactory quality condition, meter information is captured and a message for controlling the operation of the meter is sent to the meter.

29 Claims, 3 Drawing Sheets (51) Int. Cl.
*G01D 4/00* (2006.01)
*G05D 1/02* (2020.01)
*H04B 17/318* (2015.01)
*H04B 17/391* (2015.01)

(52) U.S. Cl.
CPC ......... *H04B 17/318* (2015.01); *H04B 17/391* (2015.01); *H04Q 9/00* (2013.01); *H04Q 2209/40* (2013.01); *H04Q 2209/50* (2013.01); *H04Q 2209/60* (2013.01); *Y02B 90/20* (2013.01); *Y04S 20/30* (2013.01)

(58) Field of Classification Search
CPC ........... H04Q 2209/50; H04Q 2209/60; G01D 4/006; H04B 17/318; H04B 17/391; Y02B 90/243; Y04S 20/325
USPC ....................................................... 324/557
See application file for complete search history.

(56) References Cited

U.S. PATENT DOCUMENTS

| | | | |
|---|---|---|---|
| 2001/0038342 A1 | 11/2001 | Foote | |
| 2005/0068194 A1* | 3/2005 | Schleich | H04Q 9/00 340/870.02 |
| 2005/0184882 A1 | 8/2005 | Angelis et al. | |
| 2008/0077326 A1* | 3/2008 | Funk | G08B 25/016 701/500 |
| 2010/0198514 A1* | 8/2010 | Miralles | F41G 9/002 701/302 |
| 2010/0250022 A1* | 9/2010 | Hines | G05D 1/0094 701/2 |
| 2014/0218239 A1* | 8/2014 | Sharawi | G05D 1/08 342/422 |
| 2015/0163849 A1* | 6/2015 | Bauer | G01D 4/006 702/62 |
| 2016/0107749 A1* | 4/2016 | Mucci | G08B 29/185 701/3 |
| 2017/0192418 A1* | 7/2017 | Bethke | G08G 5/0034 |
| 2018/0073918 A1* | 3/2018 | Onasch | G01J 1/0266 |
| 2018/0081355 A1* | 3/2018 | Magy | H04L 67/12 |
| 2018/0089622 A1* | 3/2018 | Burch, V | G01S 5/0018 |

OTHER PUBLICATIONS

Dehghan, S.M.M., Moradi, H. and Shahidian, S.A.A., Oct. 2014, Optimal path planning for DRSSI based localization of an RF source by multiple UAVs. In 2014 Second RSI/ISM International Conference on Robotics and Mechatronics (ICRoM) (pp. 558-563). IEEE. (Year: 2014).*

Nigam, N. and Kroo, I., Mar. 2008, Persistent surveillance using multiple unmanned air vehicles. In 2008 IEEE Aerospace Conference (pp. 1-14). IEEE. (Year: 2008).*

Shuxia, G., Zhongyao, D., Zhantao, H. and Chufeng, H., 2013. Simulation of dynamic electromagnetic interference environment for Unmanned Aerial Vehicle data link. China Communications, 10(7), pp. 19-28. (Year: 2013).*

Cheng, C.M., Hsiao, P.H., Kung, H.T. and Vlah, D., Mar. 2007, Maximizing throughput of UAV-relaying networks with the load-carry-and-deliver paradigm. In 2007 IEEE Wireless Communications and Networking Conference (pp. 4417-4424). IEEE. (Year: 2007).*

Neto Jose Rodrigues Torres et al., Towards the Use of Unmanned Aerial Vehicles for Automatic Power Meter Readings, Oct. 26, 2015, pp. 379-386.

* cited by examiner

METHOD FOR COMMUNICATION BETWEEN AT LEAST ONE METER DEVICE AND AN AIRBORNE DEVICE

CROSS-REFERENCE TO RELATED APPLICATION

This is a continuation application, under 35 U.S.C. § 120, of copending international application No. PCT/EP2017/000413, filed Apr. 4, 2017, which designated the United States; this application also claims the priority, under 35 U.S.C. § 119, of German patent application No. DE 10 2016 005 403.4, filed Apr. 30, 2016; the prior applications are herewith incorporated by reference in their entirety.

BACKGROUND OF THE INVENTION

Field of the Invention

The invention relates to a method for communication between at least one meter device and a flying device, wherein the meter device is configured for recording a consumption and/or for collecting captured consumption data. In addition, the invention relates to a flying device.

Supplying energy or water will frequently involve meters of a multiplicity of consumers being read. In order to allow cost-efficient reading, remote reading methods are known that involve a recording device being brought close to the meters and receiving the meter information from a meter or multiple meters by radio communications. A recording device of this kind can be carried by a meter reader or transported along a road onboard a motor vehicle, for example.

A disadvantage of remote recording of this kind is that satisfactory reception of the meter information cannot be achieved for all meter devices. If, by way of example, information needs to be captured from geographically remote meters, for example on islands, in woods or on coasts, this requires a considerable time involvement. Also, a walk-by or drive-by meter frequently does not allow meter information to be received from meters on higher floors of multi-story buildings. To solve these problems, it is known practice to use recording devices capable of flight for remotely reading meter data. By way of example, it is known practice to use model helicopters with a receiver arranged thereon to fly over fixed reading positions at which meter data are supposed to be received. When flying over fixed positions in this manner, however, an adequate reception quality is not always achieved in order to receive the meter information. In this case, the entire reading route needs to be flown again or a new reading route needs to be stipulated. This increases the outlay for meter reading.

SUMMARY OF THE INVENTION

The invention is therefore based on the object of specifying a method for communication with a meter device that allows a contrastingly improved communication quality and reliability.

The object is achieved according to the invention by a method of the type cited at the outset, wherein the flying device performs the following steps:
a) movement of the flying device to a prescribed target position associated with the meter device;
b) reception of received signals on a radio channel associated with the meter device by a reception device of the flying device and ascertaining at least one piece of quality information, relating to a communication quality on the radio channel, on the basis of the received signals, wherein nonsatisfaction of a quality condition, satisfaction of which is dependent on the piece of quality information, results in the reception of received signals and the ascertainment of the piece of quality information being repeated after a communication protocol for communication with the meter device has been changed and/or while a position of the flying device and/or a directivity of the reception device are altered until the quality condition or a termination condition is satisfied, and in the event of satisfaction of the quality condition; and
c) capturing at least one piece of meter information sent by the meter device by means of evaluation of the received signals and/or sending a control message for controlling the operation of the meter device to the meter device.

According to the invention, it is therefore proposed that the capture of the piece of meter information and the transmission of control messages involve a communication quality on the radio channel associated with the meter device being evaluated and, if required, a position of the flying device and/or a directivity being adapted and/or a communication protocol used being changed in order to improve the communication quality before the piece of meter information is captured or the control message is transmitted. The method according to the invention can therefore involve dynamic reaction to the communication quality and therefore to factors that have an influence on the communication quality. As such, by way of example, it is possible to react when environment objects block reception of signals from a meter device or when a radio channel is blocked by interference sources. Adaptation of the position of the flying device or of the directivity allows the reception quality for one or more meters to be optimized, and interference sources can be masked out. The quality condition can consist of multiple logically combined subconditions that evaluate in particular different pieces of quality information.

The piece of meter information can describe consumption or consumption data, but also a piece of status information or the like. Control messages can be used, by way of example, to configure a meter device via the flying device or to load a firmware update.

The meter device can send the piece of meter information periodically or after a request from the flying device that is sent by radio. The flying device can send this request in particular only after satisfaction of the quality condition or after satisfaction of a subcondition, for example in the event of a drop below a maximum channel load. On satisfaction of a termination condition, it is initially not possible for a measurement to be effected or for the transmission of a control message for the meter device or multiple meter devices at the target position to be effected. It is possible for the flying device to fly back to a parking position and/or to initially fly to a different target position in order to capture pieces of meter information from other meter devices or to control the latter. A termination condition may be the exceeding of a time limit value describing a maximum dwell time at a target position or in the environment of a target position, for example. It is also possible for the termination condition to evaluate a piece of state information from the flying device, in particular a state of charge of batteries.

The piece of quality information can describe a summed power level for all received signals and/or a meter power level for those received signals that have been sent by the meter device, and/or a further power level for further received signals received with a temporal and/or spectral stagger in comparison with the received signals sent by the meter device, and/or a signal-to-noise ratio and/or a channel load and/or an error rate based on data packets sent by the meter device and/or a measure of errors in the data packets that are corrigible by the communication protocol used.

To distinguish between the signal levels associated with the meter device and the signal levels from interference sources, the temporal profile of the summed power level can be evaluated. If, by way of example, a mean separation between two transmission pulses from the meter device, which, by way of example, are each consistent with a single data packet or a data message combining meter information in a particular data structure, and/or the mean length of the transmission pulses is known, appropriate structures in the temporal profile of the summed power level can be detected and evaluated in order to distinguish between the power contributions. It is also possible for known structures in the transmission signal from the meter device, for example a pilot signal, to be detected in order to detect a beginning and/or an end of a transmission process of the meter device and to correlate this with the temporal profile of the summed power level. So as also to detect interference as a result of crosstalk from adjacent radio channels in the frequency band, it may be advantageous to also evaluate further power levels of spectrally adjacent further received signals, that is to say of received signals of adjacent frequencies.

To determine a channel load, it is preferably ascertained for which time component of a prescribed measurement interval a prescribed reference value for the overall signal level is exceeded. Alternatively, a channel load could also be ascertained by virtue of the overall signal level being averaged over a prescribed time interval.

An error rate can be ascertained if it is ascertainable how many data packets should be received within a prescribed period. This number can be compared with a number of successfully received and decoded data packets. Successful reception can be ascertained by means of a checksum or the detection of particular prescribed data structures, for example. It may be known how many packets are sent on average by the meter device. It is also possible for particular structures of the data packets, for example pilot signals, to be recordable even if the reception quality is not sufficient for correct reception of the data packets. The number of data packets sent can therefore be ascertained correctly even if some data packets are not received correctly. It is also possible for the data packets each to comprise a sequence number. Following correct reception of two data packets, it is possible in this case to ascertain directly how many data packets have not been received correctly.

Radio protocols frequently allow error correction for received data, for example on the physical layer and/or on a higher protocol layer. The correction may be explicit, but it is also possible for only probabilities of the correctness of the received data to be ascertainable. In both cases, it is possible to determine a measure of the corrigible errors that is at the same time also a measure of the reception quality achieved.

The quality condition or one of multiple subconditions logically combined for evaluation of the quality condition may be satisfied right when, within a prescribed measurement interval, the summed power level and/or the further power level and/or the reciprocal of the signal-to-noise ratio and/or the channel load for at least one prescribed time component of the measurement interval are less than a respective prescribed reference value. The time component may be between 10% and 40% of the measurement interval, for example. The reference value for a summed power level may be between −70 dBm and −90 dBm or between −50 dBm and −70 dBm, for example.

An environment model describing at least the respective position of the at least one meter device can be taken as a basis for ascertaining a forecast value for the meter power level, after which the reference value is determined on the basis of the forecast value. Preferably, the environment model additionally describes environment objects that can attenuate the meter power level and/or the transmission powers of the meter device or of the meter devices. A control device of the flying device or an external device can compute a reception power expected for the instantaneous position of the flying device as a forecast value. In the simplest case, exclusively the distance to the respective meter device is taken into consideration. Preferably, an attenuation by environment objects and/or the directivity of the reception device are additionally taken into consideration. If there are multiple meter devices in the environment of the flying device, then the contributions of the meter devices can be added. Alternatively, e.g. only the meter device furthest away from the flying device or the meter device having the smallest power contribution can be taken into consideration. The forecast value can therefore describe a power level of a signal that is still supposed to be received correctly in order to capture meter information from all meter devices. The forecast value can have an offset added to it in order to ascertain the reference value. This allows a minimum signal-to-noise ratio to be prescribed that is supposed to be observed.

Alteration of the position of the flying device can be effected such that during the change of position by half a wavelength of a received signal to be received the received signal is repeatedly captured and evaluated. This is advantageous particularly if the received signal or part of the received signal is reflected from environment objects such that standing waves result. In this case, the reflected waves can cancel one another out at some positions, so that no reception is possible. A slow movement from a wave node of this kind while the quality information is monitored allows reliable reception of the meter information in this case too.

The method according to the invention is preferably used for reading multiple meter devices. In this case, a target position can be associated with each individual meter device or with a respective group of meter devices. The target positions can be prescribed in the course of route planning, the route planning being able to involve meter positions, functions and parameters known from network planning, for example a transmission power of the meter devices, being taken into consideration.

The directivity can be altered by virtue of the orientation of the flying device being altered. This is expedient if a reception device having one or more directional antennas firmly arranged on the flying device is used. The orientation can be adapted by a rotation about a vertical axis of the flying device and/or an inclination relative to a ground.

The reception device can have multiple antennas, wherein ascertainment of the received signals involves antenna signals received by the antennas being added to form a summed signal, wherein the directivity is altered by means of alteration of a respective phase and/or of respective amplitude of the antenna signals in the summed signal. Such alteration of the directivity is also called beamforming. In particular, digital beamforming can be used, which results in alteration of the phase and/or of the amplitude being affected after an analog-to-digital conversion of the respective antenna signals. The phase shift can be affected by means of convolution with a convolution signal, which is to say in the form of what is known as a finite impulse response filter. Prescription of applicable amplitudes and/or phases allows an array of antennas to act as an "artificial" directional antenna.

The piece of meter information can be sent to a central facility by the flying device after capture and/or the control message sent to the meter device can previously be received from the central facility by the flying device. The communication with the central facility can be effected by mobile radio, for example based on the GSM, LTE or Edge standard, or by W-LAN. In this case, encryption of the mobile radio standard and/or separate encryption can be used. The communication can be effected directly via a radio network or via at least one or more flying devices providing a network. The provision of a network by further flying devices allows a communication with the central facility to be effected even from positions in which no mobile radio network is available, for example. It is possible for the pieces of meter information or control messages to be buffer-stored on the flying device, in particular if no communication link to the central facility is available in the region of the target position. The piece of meter information can be sent to the central facility at a later time. The control message can be transmitted from the central facility to the flying device before the latter is moved to the target position.

By way of example, the flying device can be moved into the region of a base station and in particular landed there in order to provide the piece of meter information to the base station, which subsequently transmits it to the central facility, or in order for the base station to transmit a control message provided by the central facility to the flying device. The data transmission between the flying device and the base station and/or between the base station and the central facility can be effected by wire or wirelessly. In particular, when the flying device is landed at or on the base station, a wired communication link can be automatically set up, for example by virtue of a section of the flying device reaching into a recess in the base station on landing, or vice versa, in order to provide an in particular electrical connection for signal transmission. The base station can additionally or alternatively provide a supply of power for charging energy stores of the flying device.

In the method according to the invention, multiple flying devices can be used, wherein for at least one of the flying devices the sending of the piece of meter information to the central facility and/or the receiving of the control message from the central facility are effected indirectly via at least one further flying device serving as a network node. This allows communication independent of other communication networks to be achieved over long distances.

The piece of meter information or a piece of information derived from the piece of meter information can be provided to a user by an output device of the central facility and/or a user input on an input device of the central facility can trigger the sending of the control message to the meter device via the flying device. In particular, bidirectional communication between a central-facility-based user workstation and the meter device can be provided, wherein the communication is effected via one or more of the flying devices as network nodes. The communication can be effected almost in real time, which means that an acknowledgement from the meter device in response to transmitted control commands can be output to a user within one minute or within one or ten seconds, for example. This allows dynamic configuration of the meter device, direct feedback to a user, with a loaded firmware update being able to be tested directly, for example, and a direct control option in order to be able to close particular valves in the event of leaks, for example.

In the method according to the invention, a flying area for the flying device can be prescribed, wherein the movement of the flying device to the target position and the alteration of the position of the flying device are controlled such that the flying device is always within the flying area. Control of this kind allows in particular legal requirements to be easily and reliably implemented in the method according to the invention. By way of example, a position of the flying device can be recorded and, in the event of an approach to the boundaries of the flying area, a movement device of the flying device can be automatically actuated in order to move the flying device away from the boundary of the flying area. The flying area can be prescribed such that the altitude of the flying device is restricted to a maximum level, for example 200 m, 150 m, 100 m, 50 m or 20 m. The flying area may be horizontally limited such that it extends above a prescribed ground area, for example above a particular plot of land. The horizontal surface area may be less than 1 km$^2$, 10 000 m$^2$ or 100 m$^2$. Multiple flying devices can be used, the flying areas associated with the individual flying devices being able to be separated from one another. The flying areas may in particular be separated horizontally from one another and, by way of example, be above various plots of land separated from one another. This allows communication with meter devices that are separated further from one another than the communication range of the individual flying devices, for example by virtue of a network of multiple flying devices being set up.

The flying device may be in a ground-based parking position before step a) of the method according to the invention and, after step c) of the method according to the invention, can be parked in the or a further ground-based parking position, wherein the flying device flies without ground contact at the target position and/or during the alteration of the position of the flying device in step b). Landing the flying device when it is not needed for communication with the meter device allows particularly energy-saving operation of the flying device. The climbing of the flying device to the target position increases the reception and transmission range considerably.

The target position and the parking position can be vertically above one another at the same horizontal position. This allows particularly simple control of the flying device to the target position. After leaving the parking position the flying device can be rotated about a vertical axis of the flying device before and/or during capture of the piece of meter information. The rotation can cover an angle of at least 360°, for example 720°. The rotation can be effected over a period of at least 5, 10 or 20 minutes. Even when a reception device having a directional directivity is used, it is therefore possible to communicate with meter devices in all spatial directions.

The flying device can remain at a standstill in the parking position up until reception of an activation signal and/or up until a prescribed activation time, wherein on reception of the activation signal and/or at the activation time it is moved to the target position in order to capture the piece of meter information and/or to send the control message and/or to be used as a network node in a network for transmitting the piece of meter information and/or the control message.

In the method according to the invention, pieces of meter information from multiple meter devices having the same associated target position can be read remotely, wherein capture of the pieces of meter information from some of these meter devices is followed by the position of the flying device and/or the directivity being altered on the basis of a piece of position information describing a position of at least one meter device whose piece of meter information has not yet been captured. In particular, a movement in the direction of this meter device or an orientation of a sensitivity maximum of the reception device in the direction of this meter device can be effected.

Alteration of the position of the flying device and/or of the directivity can be effected such that the piece of quality information or at least one of the pieces of quality information or a variable derived from the piece of quality information or from at least one of the pieces of quality information is maximized or minimized. By way of example, a ratio of a useful component of the received signal, associated with the meter device, to an interference component of the received signal, associated with at least one interference source, can be maximized. Therefore, appropriate adaptations of the position and/or directivity allow influences of interference sources to be minimized in a targeted manner. In this case, the alterations can be effected such that interference signals are attenuated to a greater extent than useful signals.

A position of at least one interference source contributing to the interference component of the received signal can be ascertained, after which the directivity is altered such that a reception sensitivity of the reception device in the direction of the interference source is reduced, and/or after which the position of the flying device is altered on the basis of prescribed environment data describing the environment of the flying device, such that at least one environment object described by the environment data is between the interference source and the flying device. Positions of interference sources may be prescribed or can be ascertained, for example by triangulation. The environment data can be ascertained from prescribed map data and/or can be provided by at least one environment sensing device of the flying device.

In the method according to the invention, environment data describing the environment of the flying device can be prescribed, wherein the position of the flying device is altered such that at least one environment object described by the environment data is separated from a connecting line between the reception device and the meter device and/or from an ellipsoid of rotation whose focal points are the reception device and the meter device. This can involve the environment data already explained above, provided by map data and/or an environment sensing device, being used. The connecting line and the ellipsoid of rotation may be prescribed in particular for the respective antennas of the meter device and the reception device. An applicable ellipsoid of rotation is consistent with the first Fresnel zone of the radio link. Preferably, the position of the flying device is altered such that at least 55% of the first Fresnel zone is free of environment objects.

The target position and/or a time of performance of steps a) to c) and/or the communication protocol used for communication with the meter device and/or an order in which multiple target positions at which pieces of meter information are supposed to be captured and/or control messages are supposed to be sent are flown to can be prescribed on the basis of a piece of quality information ascertained for the associated meter device in a preceding pass of steps a) to c) and/or on the basis of a position of the flying device and/or a directivity for which the quality condition was satisfied in one of the preceding passes of steps a) to c) in each case. In particular, success rates can be ascertained for multiple positions in the environment of a meter device or a group of meter devices, which describe a frequency with which a piece of meter information has been ascertained successfully at an applicable position. The quality information ascertained can be reception strengths, channel utilization levels or signal-to-noise ratios, for example. A position can be described by a geographical longitude and latitude, a height and an orientation of an angle of azimuth and of an angle of inclination of the directivity, for example. The success rates and quality information associated with the respective positions can be taken as a basis for performing prioritization for these positions. When planning a route for capturing meter information for the flying device, the target position can be chosen such that it coincides with the most highly prioritized of these positions. The prioritization can also involve a time factor being taken into consideration, so that, depending on the time of day or the day of the week, for example, a target position is determined to which the flying device is supposed to be moved. Alternatively, the target position selected can be that position at which the quality condition for the applicable meter device was satisfied most recently.

The target position and/or the communication protocol used for communication with the meter device and/or an order in which multiple target positions at which pieces of meter information are supposed to be captured and/or control messages are supposed to be sent are flown to can be prescribed on the basis of a time of performance of steps a) to c). In particular, it is possible to take into consideration whether the steps are carried out by day or night and/or on which day of the week the steps are performed.

A route for recording multiple meter devices can involve meter information being ascertained from multiple individual meter devices each having an associated target position and/or from clusters or subclusters of meter devices each having an associated target position. For each of these meter devices or for each cluster or subcluster, a separate target position can be prescribed. This can be affected as explained above.

Prescription of the target position and/or alteration of the position of the flying device and/or of the directivity can be effected on the basis of a position of the meter device and/or at least one interference source interfering with reception of the piece of meter information, wherein the position is ascertained by the flying device or by multiple cooperating flying devices by means of triangulation and/or by means of determination of at least one propagation time of a transmission signal from the meter device and/or the interference source. For triangulation, a direction from which a transmission signal is received can be sensed by virtue of the directivity of the reception device being varied and the respective signal strengths being evaluated. A measurement of this kind at multiple points that is able to be effected at the same time or with staggered timing by multiple flying devices or by flying over these points with a single flying device allows the position of the transmitter to be determined. If the transmission signal contains time information or if multiple flying devices having synchronized clocks are used, separation determination can be effected by means of propagation time determination. The transmitter position can be determined from multiple separations or one separation and one solid angle.

The control message can be taken as a basis for the meter device to alter a degree of opening of a valve of the meter device and/or to adjust an internal clock of the meter device and/or to change a computation variable describing a relationship between the consumption and/or the consumption data and the piece of meter information and/or to change a control program controlling operation of the meter device and/or to change a radio protocol used for sending the piece of meter information.

Besides the method according to the invention, the invention relates to a flying device having at least one movement device for moving the flying device, at least one reception device and a control device for controlling the movement device, wherein the flying device is configured for performing the method explained above. The control device can actuate the movement device for the purpose of moving the flying device to the target position. Subsequently, the control device can receive and evaluate received signals via the reception device in order to determine the quality information. So long as the quality information does not satisfy a quality condition evaluated by the control device, the control device can actuate the movement device in order to change a position of the flying device by means of a movement of the flying device and/or a directivity of the reception device by rotating or tilting the flying device, and/or can actuate the reception device in order to adapt the directivity by adapting phases and/or amplitudes of mixed antenna signals. Additionally or alternatively, the communication protocol can be changed.

Preferably, the flying device may be a quadrocopter. These allow particularly flexible adaptation of the position and orientation of the flying device.

The flying device can have a communication device by which data transmitted from a first further flying device to the flying device are forwardable to a second further flying device and/or a central facility and/or vice versa. The use of a communication device of this kind allows multiple flying devices to set up a network for, in particular bidirectional, communication via multiple flying devices. In this case, it is possible for the flying devices to land at defined positions close to a setpoint position at which they are supposed to be used for network setup. At defined times and/or on reception of an activation signal, the flying devices can start and can promptly go to the setpoint position at which network setup is rendered possible.

The flying device can have a carrying device by means of which consignments to be delivered are supportable on the flying device and automatically droppable. This allows the flying device to be used for delivering consignments during the capture of meter information or separately therefrom. By way of example, the flying device can deliver parcels for a parcel service.

The flying device may be set up to use at least two selectable, different communication protocols to communicate with the meter device, the communication protocols differing in terms of the ranges and/or data rates achievable for the same transmission power and/or in terms of interference immunity with respect to interference sources. By way of example, capture of the meter information can involve a communication protocol with a long range and a relatively low data rate being used. If a firmware update for the meter devices is supposed to be loaded, a data transfer at a higher transfer rate is advantageous. Thus, in this case, a communication protocol having a higher achievable data rate may be usable. This may require the flying device to be moved closer to the meter device in order to achieve reliable communication. In these cases, it may be advantageous to use networks comprising multiple flying devices, as explained above, in order to achieve fast and reliable bidirectional communication.

The invention also relates to a recording system for recording a consumption that contains multiple meter devices arranged in a scattered manner by means of which a respective consumption is recordable and/or captured consumption data are collectable, and at least one flying device according to the invention by means of which pieces of meter information from the meter devices are capturable.

Other features which are considered as characteristic for the invention are set forth in the appended claims.

Although the invention is illustrated and described herein as embodied in a method for communication between at least one meter device and an airborne device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
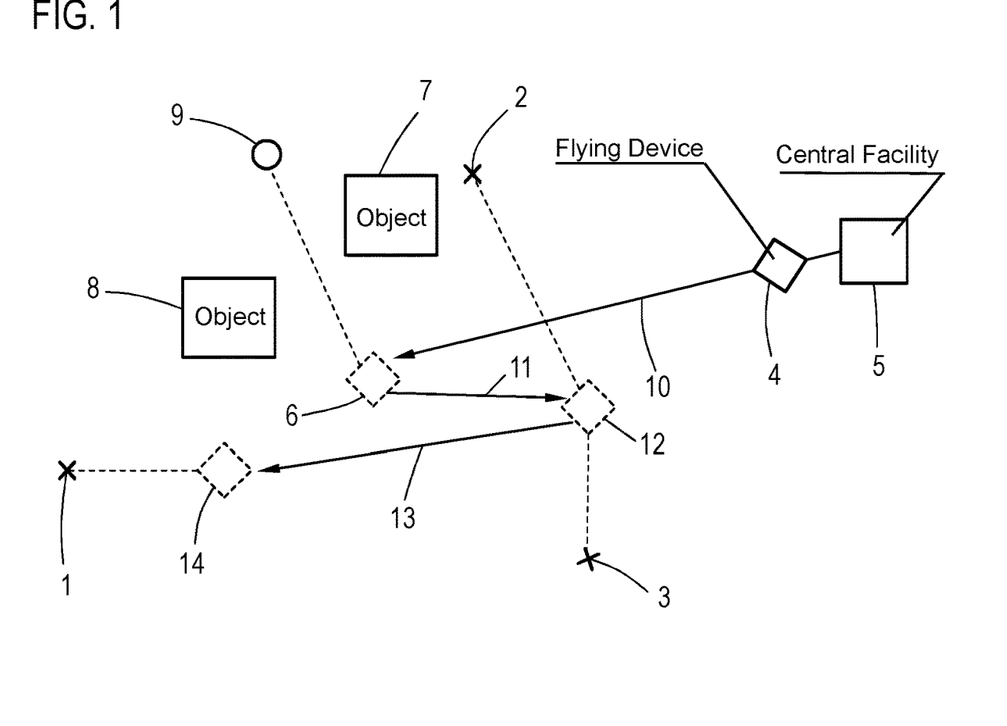
FIG. 1 is an illustration of an exemplary embodiment of the method according to the invention.

Referring now to the figures of the drawings in detail and first, particularly to FIG. 1 thereof, there is shown an exemplary embodiment of a method for capturing a piece of meter information, sent by the respective meter devices 1, 2, 3, using a flying device 4. The meter devices 1, 2, 3 each capture consumption data of a supply network, not shown, for example a gas, water or energy supply. In alternative exemplary embodiments, it would be possible for one or more of the meter devices 1, 2, 3 not to measure consumption themselves, but rather to collect consumption data from multiple measuring devices as an aggregator.

The meter devices 1, 2, 3 are supposed to be read and the read meter information is supposed to be provided to a central facility 5 in which it can be evaluated, for example for the purpose of controlling the network and/or for invoicing. To this end, a computation device, which may be arranged in the central facility 5, but may also be a part of the flying device 4, plans a reading route along which meter information from the meter devices 1, 2, 3 is supposed to be captured by virtue of the flying device 4 being moved to one or more target positions 6 in order to capture, at the target position 6 or in the environment of the target position 6, meter information from the meter devices 1, 2, 3 associated with the target position 6. FIG. 1 depicts only one target position 6 for reasons of clarity. Real evaluation routes will frequently have multiple target positions 6 each having associated meter devices 1, 2, 3 that are flown to in succession by the flying device 4. The behavior of the flying device 4 at the further target positions is consistent with the behavior at the target position 6.

In the exemplary embodiments explained with reference to FIG. 1 and FIG. 2, primarily the reception of meter information is explained. Additionally or alternatively, however, it would be possible to fly to the or a further target position in order to send a control message for controlling the operation of at least one of the meter devices 1, 2, 3 to the applicable meter device. An applicable control message can be received previously from the central facility 5.

The reading route can be planned on the basis of grid information describing a supply grid with which the meter devices 1, 2, 3 are associated. This grid information can preferably describe the physical positions and/or further data, for example a transmission power, of the meter devices 1, 2, 3. In the case shown in FIG. 1, the target position 6 is ascertained such that it is substantially in the middle between the meter devices 1, 2, 3 associated with a common measuring cluster. In alternative exemplary embodiments, the route planning and therefore the stipulation of the target position 6 could already involve information about the environment objects 7, 8, which are multi-story buildings, or about interference sources 9 whose position is already known being taken into consideration. Additionally or alternatively, the route planning, in particular the selection of the target position 6 and/or an order in which multiple target positions 6 are flown to, can be effected on the basis of the time at which the route begins, for example on the basis of a day/night cycle. By way of example, it is possible to take into consideration that particular interference sources 9 are active only at particular times of day.

For the target positions 6, a geographical longitude and latitude, an altitude, an angle of azimuth, that is to say a rotation of the flying device 4 with respect to its vertical axis, and an angle of inclination, that is to say a relative tilt of the flying device 4 with respect to the ground, are prescribed in each case. Additionally, it is possible to prescribe which of multiple usable communication protocols is used for communication with the meter devices 1, 2, 3 at the respective target position 6. After the reading route is stipulated, it is started at a prescribed time. At this time, the flying device 4 is first of all moved along the arrow 10 to the target position 6. After the target position 6 is reached, a reception device of the flying device 4 receives received signals on a radio channel associated with the meter devices 1, 2, 3. On the basis of these received signals, firstly an error rate for data packets received from the meter devices 1, 2, 3 and secondly a channel load are ascertained as quality information describing a communication quality on the radio channel.

The meter devices 1, 2, 3 send the meter information periodically at a prescribed interval of time. In an alternative embodiment, it would also be possible for the meter devices 1, 2, 3 to send signals only after reception of a request message that has been sent by the flying device 4.

A channel load is ascertained by evaluating for which time component of a measurement interval a mean summed power level of all received signals received via the reception device on the radio channel or the radio channels associated with the meter device(s) 1, 2, 3 is above a prescribed reference value, so that no communication with the meter devices 1, 2, 3 is possible in this time component. To ascertain the reference value, a respective forecast value associated with the meter devices 1, 2, 3 is first of all ascertained for the meter power levels of the signals received from the respective meters. To this end, an instantaneous ego position of the flying device 4 can be ascertained, for example by using a GPS sensor. The positions of the individual meter devices 1, 2, 3 in world coordinates are known. By way of example, as explained above, they can be determined from the grid information or may have been ascertained by means of a preceding triangulation. From the ego position and the world coordinates of the meter devices 1, 2, 3, it is possible to ascertain the separations between the flying device 4 and the meter devices 1, 2, 3. From these, it is possible, in particular by taking into consideration environment data describing potentially attenuating objects and/or by taking into consideration the directivity of the reception device, to compute a meter power level that can be expected for the received signals received from the individual meter devices. The lowest of these meter power levels is used as a basis for the reference value in order to ensure that the interference is lower than the weakest meter signal to be measured. This meter power level can have an offset added to it, which may also be negative, in order to determine the reference value, for example in order to take into consideration properties of the communication protocol used or of the reception device.

As further quality information, an error rate for the data packets received from the respective meter device is determined for each of the meter devices 1, 2, 3. The error rate determined can be a ratio of sent packets to correctly received packets, for example. This is possible in a particularly simple manner if the individual data packets have serial numbers. In this case, missing packets can easily be detected. Erroneous packets can be detected by evaluating checksums, for example. An applicable error rate can also easily be computed if the frequency at which the individual meter devices send on average over time is known for each of the meter devices, since the number of packets received can be compared with the mean number of packets expected for the applicable interval.

Reception of received signals and ascertainment of the quality information are effected repeatedly. In the meantime, in order to improve the reception situation, so long as a quality condition evaluating the quality information is not satisfied, it is possible for the flying device 4 to be moved in order to adapt a position of the flying device 4 and/or it is possible for a directivity of the reception device to be adapted. Alternatively or additionally, a communication protocol used for communication with the meter device can be adapted. The quality condition contains two subconditions that both need to be satisfied in order to satisfy the quality condition. These compare the channel load and the error rate with a respective prescribed limit value and are satisfied only if the respective limit value is not reached. In the example shown, the reception device used for the flying device 4 is an omnidirectional antenna, so that adaptation of the directivity is not possible. This limitation is provided for reasons of clarity. An example concerning the adaptation of the directivity will be explained later with reference to FIG. 2. Naturally, the two approaches can be combined, so that combined adaptation of the position of the flying device 4 and the directivity can be effected in order to improve the reception situation.

One problem with reception of the meter information at the target position 6 is that said target position has an uninterrupted line of reception to the interference source 9. The interference source 9 may be another communication device operating on the same radio channel as the meter devices 1, 2, 3. However, it is also possible for interference to be effected by other devices, for example electric machines effecting wideband interference. On the basis of the reception of the radio signals from the interference source 9, the recorded channel load is very high and exceeds the applicable limit value.

Thus, the first subcondition and thus also the quality condition are not satisfied, which means that a change in the reception position of the flying device 4 is supposed to be effected. To ascertain how an applicable alteration is supposed to be effected, a piece of interference source information describing the position of the interference source 9 and a piece of environment information describing the environment objects 7, 8 can be evaluated. The piece of environment information and the piece of interference source information may be stored on a data memory of the flying device 4, can be transmitted by the central facility 5 or can be captured by the flying device 4.

In order to ascertain the position of the interference source 9, a signal sent by the interference source 9 can be captured at multiple different positions of the flying device 4 or, if directivity is alterable, with multiple different directivities in order to ascertain the position of the interference source 9 on the basis of a triangulation. A triangulation can be effected by recording the direction from which the interference signal is received at multiple positions. This is possible by adapting the reception characteristic. Additionally or alternatively, separations can be ascertained at multiple positions by evaluating propagation times or/and signal attenuations. Environment data can be captured, insofar as they are not able to be taken from provided map data, by an environment sensing device, for example a camera. Evaluation of the environment information and of the interference source information ascertains that an alteration of the position is supposed to be effected such that the flying device 4 is moved in the direction of the arrow 11.

On reaching the position 12, the line of sight to the interference source 9 is blocked by the environment object 7, which means that the channel load drops below the applicable limit value. The applicable subcondition of the quality condition is therefore satisfied.

The remaining subcondition evaluated is whether the error rate is low enough to allow capture of the respective associated meter information. If there is sufficiently high transmission power from the meter devices 1, 2, 3, this would be the case on the basis of the specially high signal strength at the position 12, and the three associated pieces of meter information could be captured. In the example shown, the transmission power of the meter device 1 is relatively low, however, so that the separation of the meter device 1 from the position 12 means that the reception strength of the signal associated with the meter device 1 is not sufficient to achieve a sufficiently low error rate. The quality condition is therefore satisfied only for the meter devices 2, 3, so that initially only the meter information from these meter devices 2, 3 is captured. In cases in which control messages are supposed to be transmitted to the meter devices 1, 2, 3, the control messages can now be transmitted to the meter devices 2 and 3.

After the meter information for the meter devices 2, 3 has been captured, the meter information can be transmitted to the central facility 5, for example via W-LAN or according to a mobile radio standard. Alternatively, it would be possible for the meter information to be stored first and transmitted to the central facility 5 at a later time.

After some of the meter information, namely the meter information for the meter devices 2, 3, has been captured, the control device of the flying device 4 actuates a movement device of the flying device 4 in order to adapt the position of the flying device 4 on the basis of a piece of position information describing the position of the remaining meter device 1, which has not yet been read. In the case shown, the flying device 4 is moved along the arrow 13 in the direction of the meter device 1 for this purpose. However, it would be possible to stipulate a different path, with the environment objects 7, 8 and/or known positions of interference sources 9 being able to be taken into consideration. When the position 14 is reached, the reception strength of the signal component of the received signals that is associated with the meter device 1 is sufficiently high, so that the error rate is below the associated limit value, with the channel load continuing to be sufficiently low, which means that the quality condition is also satisfied for the meter device 1. Therefore, the meter information for the meter device 1 is captured by evaluating the received signals. This meter information is also transmitted to the central facility 5, as described above. Alternatively or additionally, a control message can be transmitted to the meter device 1. Subsequently, the flying device 4 can return to the central facility 5 or to another landing spot, can be used for other tasks, for example for parcel transport, and/or can fly to further target positions in order to capture meter information from further meter devices there.

Particular radio systems and protocols have very low susceptibility to interference sources. In particular in this case, it is expedient if a low error rate of the received data packets is used as a single quality criterion or as a subcriterion whose satisfaction is sufficient for satisfying the quality condition. The quality condition may therefore be satisfied independently of other pieces of quality information when error rates are low.

The approach described allows robust reception of the meter information for the meter devices 1, 2, 3. The initial flight to the target position 6 lengthens the data capture unnecessarily, however. It is thus advantageous if, when the reading described above is repeated at later times, information captured during preceding readings is taken into consideration. Thus, the quality information captured at the target position 6, the positions 12, 14 and at positions in between along the arrows 11, 13 is additionally transmitted to the central facility 5. Additionally, the positions 12, 14 at which the meter information was successfully captured are stored. Applicable quality information and positions are stored over multiple read processes and statistically evaluated in order to determine an optimum new target position for subsequent capture routes.

By way of example, the optimum target position ascertained could be the position 12. It is also possible for the statistical evaluation to be taken as a basis for canceling the association of the meter devices 1, 2, 3 with a common target position and prescribing separate target positions for the individual meter devices 1, 2, 3 or parts of the meter devices 1, 2, 3. Determination of the target position or of the target positions is an optimization problem. To solve such optimization problems, a multiplicity of approaches are known, which is why these will not be explained in more detail.

The statistical evaluation explained can also be effected on a time-dependent basis, so that a distinction is drawn between different times of day or days of the week, for example. If the interference source 9 is active only at particular times, for example, different target positions 6 can be prescribed for times at which the interference source 9 is active and for times at which the interference source 9 is not active, for example. Also, the statistical evaluation can be taken as a basis for varying the time at which the reading route is started, and/or altering the order in which different target positions 6 on the route are flown to.

Figure 2:
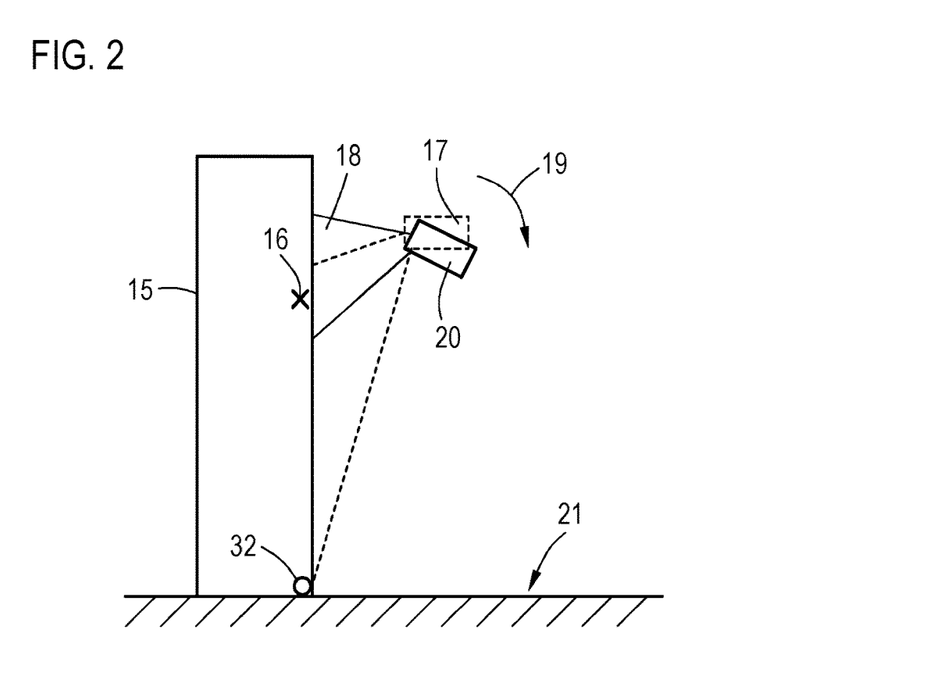
FIG. 2 is an illustration of a further exemplary embodiment of the method according to the invention.

FIG. 2 shows a further exemplary embodiment for the capture of a piece of meter information. In this case, a building 15 has both a meter device 16 to be read and an interference source 32 arranged in it. The flying device 20 used comprises, as reception device, an antenna having a fixed directivity 18 for the flying device 20. To capture the meter information, the flying device 20 is first moved to the target position 17, in which it is not inclined with respect to the ground 21. The target position 17 contains both the meter device 16 and the interference source 32, in the reception lobe prescribed by the directivity 18, so that the interference source 32 interferes with reception of the meter information and therefore, as explained above with regard to FIG. 1, the quality condition is not satisfied.

Figure 4:
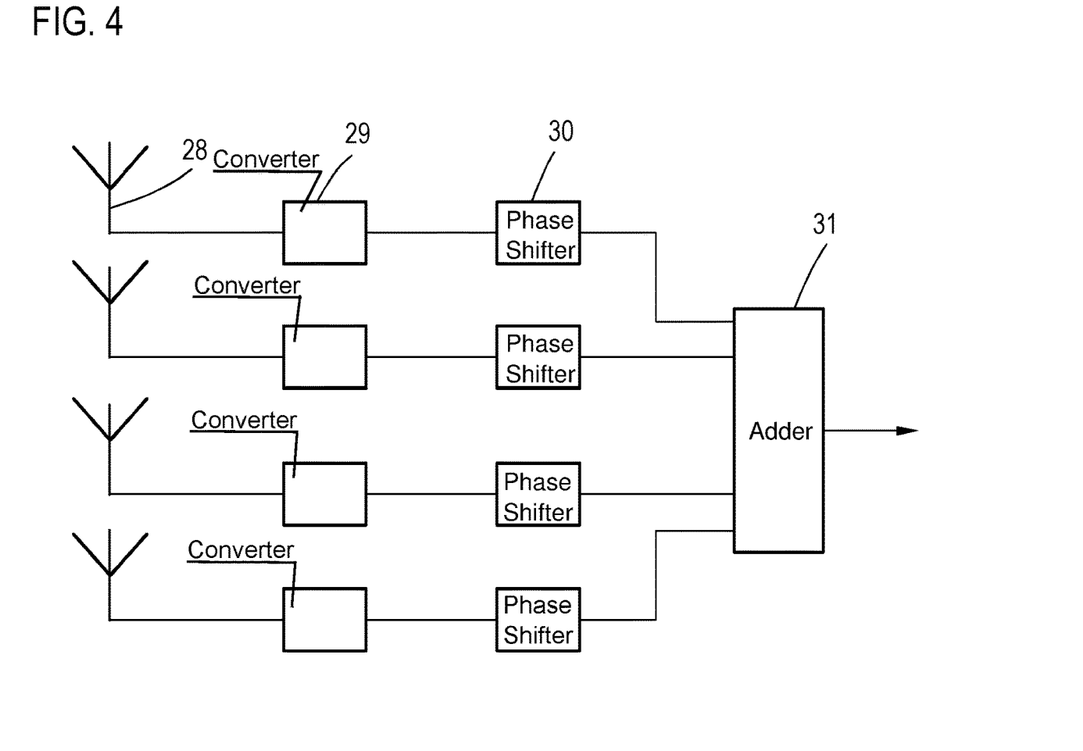
FIG. 4 is an illustration showing a detail view of components of a reception device of the flying device shown in FIG. 3.

In this case, it would be possible, as explained with regard to FIG. 1, to adapt the position of the flying device 20. In the present case, however, the directivity 18 is adapted instead by altering an angle of inclination of the flying device 20 with respect to the ground 21, as depicted by arrow 19. An applicable inclination of the flying device 20 is possible even without a positional alteration, in particular in the event of the flying device 20 used being a quadrocopter, so that a prescribed angle of inclination can be maintained over any length of time. An alternative option for adapting the directivity would be to use multiple antennas, the signals of which are added within the realms of beamforming. Such an option will be explained with reference to FIG. 4. The option of also adapting directivity besides a position firstly allows faster and simpler improvement of the reception quality and secondly also allows reception of meter information when this would otherwise sometimes not be possible on the basis of a complex interference source situation or structure of the environment.

Figure 3:
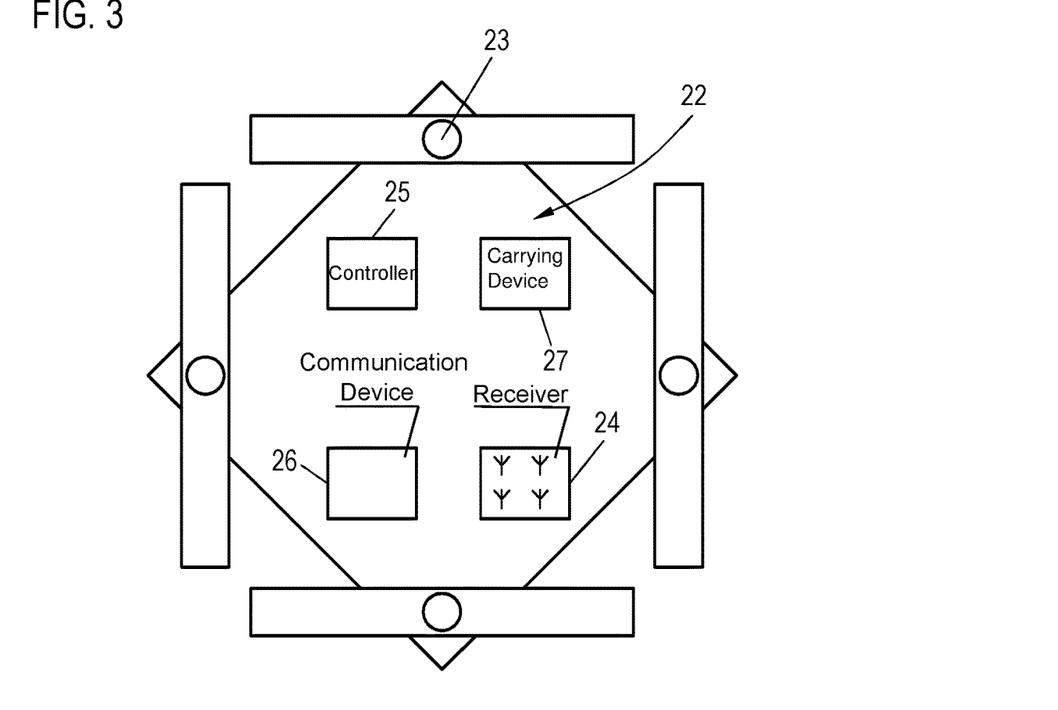
FIG. 3 is an illustration showing an exemplary embodiment of a flying device according to the invention.

FIG. 3 shows an exemplary embodiment of a flying device 22 configured for performing the methods explained with reference to FIGS. 1 and 2. The flying device 22 is configured as a quadrocopter and has four movement devices 23, namely propellers, that allow firstly the flying device 22 to fly and secondly the flying device 22 to move. Besides these, the flying device 22 has a reception device 24, which will be explained in more detail later with reference to FIG. 4. A control device 25 controls the movement devices 23 in order to move the flying device 22 to the target position, to adapt a position and/or inclination or orientation of the flying device 22 and/or to move the flying device 22 for other purposes. The control device 25 is also used to capture the meter information by virtue of its using the reception device 24 to evaluate received signals that have been received if the quality condition explained above is satisfied. After meter information has been captured, it can be transmitted to a central facility by the control device 25 using a communication device 26 of the flying device 22. This can be effected immediately or after buffer-storage in the control device 25.

The communication device 26 can also be used to set up a network containing multiple flying devices 22 by virtue of data transmitted from a first further flying device to the flying device 22 being forwarded to a second further flying device and/or a central facility and/or vice versa. The communication device 26 can also use the antennas of the reception device 24 in order to transmit control messages to the meter device and/or in order to perform bidirectional communication with meter devices. To this end, various communication protocols can be used that differ in terms of the achievable range and/or data rate for the same transmission power. By way of example, the flying device 22 can provide a firmware update for a meter device, to which end a communication protocol having a high data rate is used.

The reading of meter devices is frequently a non-time-critical task, which means that in parallel with the reading of the meter devices or at times at which no meter reading is effected, the flying device 22 can undertake other tasks. To this end, the flying device 22 has a carrying device 27 by means of which consignments to be delivered are supportable on the flying device 22 and automatically droppable. By way of example, the flying device 22 can therefore deliver parcels for delivery services during meter reading or at other times.

As explained with regard to FIG. 2, a directivity of the reception device 24 can be adapted by virtue of the entire flying device 22 being rotated or tilted. In order to make the directivity more flexibly adaptable, however, it is also possible for what is known as beamforming to be used. This is explained below with reference to FIG. 4, which shows a detail view of the components of the reception device 24. The reception device 24 has four antennas 28. The number of antennas may also be distinctly higher, the number depicted being restricted to four for reasons of clarity. Each of these antennas 28 has an associated identical processing line in which a converter 29 first of all effects an analog-to-digital conversion. The analog-to-digital conversion can be effected directly for the antenna signal or after a frequency conversion. The converted signals are supplied to a phase shifter 30 that can shift the received signals through a phase shift that is independently prescribable for the individual antennas 28. The phase shifter 30 used may also be what is known as a finite impulse response filter whose output signal is consistent with an addition of input signals shifted through a different phase shift. The output signals of the phase shifters 30 are supplied to a digital addition stage 31, which adds the signals in a manner weighted with respectively prescribable amplitudes. A phase-shifted and amplitude-weighted addition of the antenna signals from multiple antennas 28 allows a directivity to be adapted dynamically. This approach is known fundamentally in the prior art and will therefore not be explained in detail.

Figure 5:
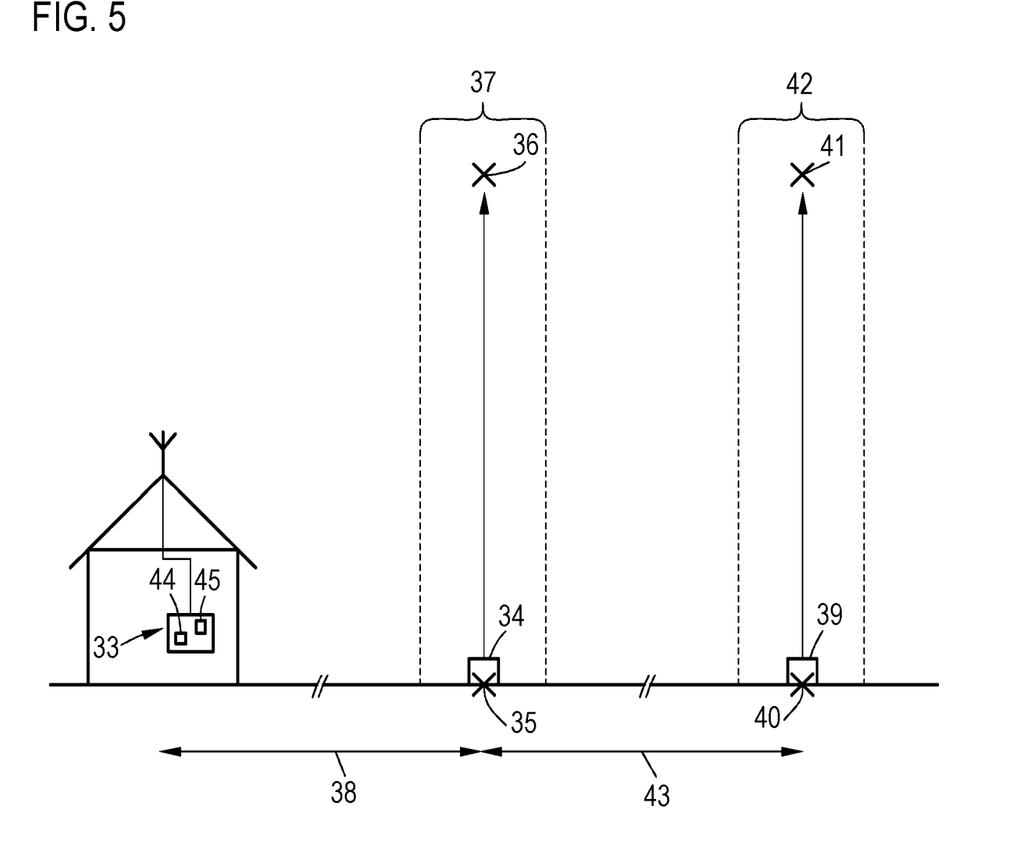
FIG. 5 is an illustration showing a further exemplary embodiment of the method according to the invention.

FIG. 5 shows a further exemplary embodiment of a method for communication between meter devices, not shown, and flying devices 34, 39. In the example shown in FIG. 5, bidirectional communication between a central facility 33 and multiple meter devices remote therefrom is supposed to be made possible in order to allow remote maintenance of the meter devices by a user. This is explained below using the example of a firmware update, that is to say a change to a program controlling the operation of the respective meter device. The approach outlined can also be used to read meter information and/or to control valves of the meter devices, for example, however.

The firmware update is started by a user input on an input device 44 of the central facility 33, for example by a selection of an applicable menu item on a user interface. In order to allow communication with the meter device, the flying devices 34, 39 are first supposed to be brought from a respective parking position 35, 40 to a respective target position 36, 41. After the target positions 36, 41 are reached, the central facility 33 can communicate at a relatively high data rate with the flying device 34, which serves as a router and transmits the signals or the data packets to the flying device 39. This is possible over distances of e.g. 10 km indicated by the arrows 38, 43 when the target positions are at a height of e.g. 50 m, 100 m or 150 m. In the case shown, a signal can be transmitted from the central facility 33 via the flying devices 34, 39 to a meter device within a 10 km radius of the parking position 40, and vice versa, for example.

After the firmware update is initiated, an activation signal is first of all sent from the central facility to the flying device 34. After the activation signal is received, the flying device 34 moves to the target position 36 and sends an activation signal to the flying device 39. The flying device 39 moves to the target position 41 on receiving the activation signal. In order to allow optimum communication with the meter device, received signals are received at the target position 41, as explained with reference to FIG. 1 and FIG. 2, quality information is determined and the position and/or orientation and/or the communication protocol is changed until the quality condition is satisfied and therefore a reliable communication path to the meter device has been set up. After the quality condition is satisfied, transmission of the firmware update is begun. After the conclusion of the update, in order to check whether the update was successful, a status message is sent via the flying devices 34, 39 to the central facility, where it is displayed to the user on an output device 45.

In many cases, it is undesirable to move flying devices through the public realm. It may therefore be advantageous to limit the flying movements to e.g. one's own plots of land 37, 42. This is achieved in the method depicted in FIG. 5 by means of two approaches. Firstly, target positions 36, 41 are prescribed that are vertically above the respective parking position 35, 40. Secondly, control is effected such that a flying area within the boundaries of the plots of land 37, 42 is prescribed that has a prescribed height, e.g. 100 m or 150 m. The flying devices 35, 40 have GPS receivers, and an actual position is regularly compared with the boundaries of the flying area. If a minimum separation from one of the boundaries is ascertained, then an automatic movement toward the middle of the flying area is effected. The flying area is also taken into consideration as part of the position adaption to satisfy the quality condition.

The following is a summary list of reference numerals and the corresponding structure used in the above description of the invention:
1 Meter device
2 Meter device
3 Meter device
4 Flying device
5 Central facility
6 Target position
7 Environment object
8 Environment object
9 Interference source
10 Arrow
11 Arrow
12 Position
13 Arrow
14 Position
15 Building
16 Meter device
17 Target position
18 Directivity
19 Arrow
20 Flying device
21 Ground
22 Flying device
23 Movement device
24 Reception device
25 Control device
26 Communication device
27 Carrying device
28 Antenna
29 Converter
30 Phase shifter
31 Addition stage
32 Interference source
33 Central facility
34 Flying device
35 Parking position
36 Target position
37 Plot of land
38 Arrow
39 Flying device
40 Parking position
41 Target position
42 Plot of land
43 Arrow
44 Input device
45 Output device

The invention claimed is:

1. A method for communicating between at least one meter device and a flying device, the meter device configured for recording consumption data and/or for collecting captured consumption data, which comprises the following steps of:
   a) moving the flying device, being capable of flight, to a prescribed target position associated with the meter device;
   b) receiving signals on a radio channel associated with the meter device by a reception device of the flying device and ascertaining at least one piece of quality information, relating to a communication quality of the radio channel, on a basis of received signals, wherein a non-satisfactory quality condition, satisfaction of which is dependent on the piece of quality information, results in a reception of the received signals and an ascertainment of the piece of quality information being repeated until a quality condition or a termination condition is satisfied, a repetition being performed after a communication protocol for communication with the meter device has been changed and/or while a position of the flying device and/or a directivity of the reception device are altered, wherein the piece of quality information describes at least one measure selected from the group consisting of: a summed power level for all the received signals, a meter power level for the received signals that have been sent by the meter device, a further power level for further received signals received with a temporal and/or spectral stagger in comparison with the received signals sent by the meter device, a signal-to-noise ratio, a channel load, an error rate based on data packets sent by the meter device, and a measure of errors in the data packets that are corrigible by the communication protocol used; and
   c) when the quality condition is satisfied, performing at least one action selected from the group consisting of: capturing at least one piece of meter information sent by the meter device by means of evaluation of the received signals, and using the flying device to send a control message for controlling an operation of the meter device to the meter device.

2. The method according to claim 1, wherein the quality condition or one of multiple subconditions logically combined for evaluation of the quality condition is satisfied when, within a prescribed measurement interval, at least on measure selected from a croup is less than a respective prescribed reference value, the group consisting of: the summed power level, the further power level, a reciprocal of the signal-to-noise ratio, and the channel load for at least one prescribed time component of a measurement interval.

3. The method according to claim 2, which further comprises taking an environment model describing at least a respective position of the at least one meter device as a basis for ascertaining a forecast value for the meter power level, after which a reference value is determined on a basis of the forecast value.

4. The method according to claim 1, which further comprises altering the directivity by virtue of an orientation of the flying device being altered.

5. The method according to claim 1, wherein:
the reception device has multiple antennas;
ascertainment of the received signals involves antenna signals received by the antennas being added to form a summed signal; and
the directivity is altered by means of alteration of a respective phase and/or of a respective amplitude of the antenna signals in the summed signal.

6. The method according to claim 1, which further comprises sending the piece of meter information to a central facility by the flying device after capture and/or in that the control message sent to the meter device is previously received from the central facility by the flying device.

7. The method according to claim 6, which further comprises using multiple flying devices, wherein for at least one of the flying devices the sending of the piece of meter information to the central facility and/or the receiving of the control message from the central facility are effected indirectly via at least one further flying device serving as a network node.

8. The method according to claim 6, which further comprises providing the piece of meter information or a piece of information derived from the piece of meter information to a user by an output device of the central facility and/or in that a user input on an input device of the central facility triggers a sending of the control message to the meter device via the flying device.

9. The method according to claim 1, which further comprises prescribing a flying area for the flying device, wherein a movement of the flying device to the prescribed target position and an alteration of the position of the flying device is controlled such that the flying device is always within the flying area.

10. The method according to claim 9, which further comprises using multiple flying devices, wherein flying areas associated with individual ones of the flying devices are separated from one another.

11. The method according to claim 1, wherein the flying device is in a ground-based parking position before step a) and, after step c), is parked in the ground-based parking position or a further ground-based parking position, wherein the flying device flies without ground contact at the prescribed target position and/or during an alteration of the position of the flying device in step b).

12. The method according to claim 11, wherein the prescribed target position is vertically above the ground-based parking position at a same horizontal position.

13. The method according to claim 11, wherein after leaving the ground-based parking position the flying device is rotated about a vertical axis of the flying device before and/or during capture of the piece of meter information.

14. The method according to claim 11, wherein the flying device remains at a standstill in the ground-based parking position up until reception of an activation signal and/or up until a prescribed activation time, wherein on reception of the activation signal and/or at the prescribed activation time the flying device is moved to the prescribed target position in order to perform at least one action selected from the group consisting of: capturing the piece of meter information, sending the control message, and being used as a network node in a network for transmitting the piece of meter information and/or the control message.

15. The method according to claim 1, which further comprises remotely reading pieces of meter information from multiple meter devices having a same associated target position, wherein capture of the pieces of meter information from some of the meter devices is followed by the position of the flying device and/or the directivity being altered on a basis of a piece of position information describing a position of at least one meter device whose said piece of meter information has not yet been captured.

16. The method according to claim 1, wherein alteration of the position of the flying device and/or of the directivity is effected such that the piece of quality information or at least one of the pieces of quality information or a variable derived from the piece of quality information or from at least one of the pieces of quality information is maximized or minimized.

17. The method according to claim 1, which further comprises ascertaining a position of at least one interference source contributing to the received signals, after which the directivity is altered such that a reception sensitivity of the reception device in a direction of the interference source is reduced.

18. The method according to claim 17, wherein environment data describing the environment of the flying device are prescribed, wherein the position of the flying device is altered such that the at least one environment object described by the environment data is separated from a connecting line between the reception device and the meter device and/or from an ellipsoid of rotation whose focal points are the reception device and the meter device.

19. The method according to claim 1, wherein the prescribed target position and/or a time of performance of steps a) to c) and/or the communication protocol used for communication with the meter device and/or an order in which multiple target positions at which pieces of meter information are supposed to be captured and/or control messages are supposed to be sent are flown to are prescribed on a basis of at least one parameter selected from the group consisting of: the piece of quality information ascertained for the meter device in a preceding pass of steps a) to c), the position of the flying device for which the quality condition was satisfied in one of the preceding passes of steps a) to c), and the directivity for which the quality condition was satisfied in one of the preceding passes of steps a) to c).

20. The method according to claim 1, wherein at least one parameter selected from a group is prescribed based on a time of performance of the steps a) to c), the group consisting of: the prescribed target position, the communication protocol used for communication with the meter device, and an order in which multiple target positions at which pieces of meter information are supposed to be captured and/or control messages are supposed to be sent are flown to.

21. The method according to claim 1, wherein prescription of the prescribed target position and/or alteration of the position of the flying device and/or of the directivity is effected on a basis of a position of the meter device and/or at least one interference source interfering with reception of the piece of meter information, wherein the position is ascertained by the flying device or by multiple cooperating flying devices by means of triangulation and/or by means of determination of at least one propagation time of a transmission signal from the meter device and/or the interference source.

22. The method according to claim 1, wherein the control message is taken as a basis for the meter device to perform at least one action selected from the group consisting of: altering a degree of opening of a valve of the meter device, adjusting an internal clock of the meter device, changing a computation variable describing a relationship between the recorded consumption data and/or the collected captured consumption data and the piece of meter information, changing a control program controlling operation of the meter device, and changing a radio protocol used for sending the piece of meter information.

23. A flying device, comprising:
at least one movement device for moving the flying device;
at least one reception device;
a control device for controlling said movement device;
the flying device is configured to communicate with at least one meter device, the meter device configured for recording consumption data and/or for collecting captured consumption data, the flying device configured to:
a) move the flying device, being capable of flight, to a prescribed target position associated with the meter device;
b) receive signals on a radio channel associated with the meter device by said reception device and ascertain at least one piece of quality information, relating to a communication quality of the radio channel, on a basis of received signals, wherein a non-satisfactory quality condition, satisfaction of which is dependent on the piece of quality information, results in a reception of the received signals and an ascertainment of the piece of quality information being repeated until the quality condition or a termination condition is satisfied, a repetition being performed after a communication protocol for communication with the meter device has been changed and/or while a position of the flying device and/or a directivity of said reception device are altered, wherein the piece of quality information describes at least one measure selected from the group consisting of: a summed power level for all the received signals, a meter power level for the received signals that have been sent by the meter device, a further power level for further received signals received with a temporal and/or spectral stagger in comparison with the received signals sent by the meter device, a signal-to-noise ratio, a channel load, an error rate based on data packets sent by the meter device, and a measure of errors in the data packets that are corrigible by the communication protocol used; and
c) when the quality condition is satisfied performing at least one action selected from the group consisting of: capture at least one piece of meter information sent by the meter device by means of evaluation of the received signals and using the fly device to send a control message for controlling an operation of the meter device to the meter device.

24. The flying device according to claim 23, wherein the flying device is a quadrocopter.

25. The flying device according to claim 23, further comprising a communication device by means of which data transmitted from a first further flying device to the flying device are forwardable to a second further flying device and/or a central facility and/or vice versa.

26. The flying device according to claim 23, further comprising a carrying device by means of which consignments to be delivered are supportable on the flying device and automatically droppable.

27. The flying device according to claim 23, wherein the flying device is set up to use at least two selectable, different communication protocols to communicate with the meter device, the communication protocols differing in terms of ranges and/or data rates achievable for a same transmission power and/or in terms of interference immunity with respect to interference sources.

28. A recording system for recording consumption, the recording system comprising:
a plurality of meter devices disposed in a scattered manner by means of which a respective consumption is recordable and/or captured consumption data are collectable;
at least one flying device by means of which pieces of meter information from said meter devices are capturable, said flying device, containing:
at least one movement device for moving said flying device;
at least one reception device;
a control device for controlling said movement device;
said flying device configured to:
a) move said flying device, being capable of flight, to a prescribed target position associated with said meter devices;
b) receive signals on a radio channel associated with said meter devices by said reception device and ascertain at least one piece of quality information, relating to a communication quality of the radio channel, on a basis of received signals, wherein a non-satisfactory quality condition, satisfaction of which is dependent on the piece of quality information, results in a reception of the received signals and the ascertainment of the piece of quality information being repeated until the quality condition or a termination condition is satisfied, a repetition being performed after a communication protocol for communication with said meter devices has been changed and/or while a position of said flying device and/or a directivity of said reception device are altered until a quality condition or a termination condition is satisfied; and
c) when the quality condition is satisfied, performing at least one action selected from the group consisting of: capture at least one piece of meter information sent by said meter devices by means of evaluation of the received signals and using the flying device to send a control message for controlling an operation of at least one of said meter devices to said one meter device; and
wherein the piece of quality information describes at least one measure selected from the group consisting of: a summed power level for all the received signals, a meter power level for the received signals that have been sent by the meter device, a further power level for further received signals received with a temporal and/or spectral stagger in comparison with the received signals sent by the meter device, a signal-to-noise ratio, a channel load, an error rate based on data packets sent by the meter device, and a measure of errors in the data packets that are corrigible by the communication protocol used.

29. The method according to claim 1, which further comprises ascertaining a position of at least one interference source contributing to the received signals, after which the position of the flying device is altered on a basis of prescribed environment data describing an environment of the flying device, such that at least one environment object described by the prescribed environment data is between the interference source and the flying device.

* * * * *